(12) United States Patent
Lehtovirta et al.

(10) Patent No.: US 9,344,412 B2
(45) Date of Patent: May 17, 2016

(54) SECURITY KEY MANAGEMENT IN IMS-BASED MULTIMEDIA BROADCAST AND MULTICAST SERVICES (MBMS)

(75) Inventors: Vesa Lehtovirta, Espoo (FI); Fredrik Lindholm, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 637 days.

(21) Appl. No.: 13/262,685

(22) PCT Filed: Mar. 31, 2010

(86) PCT No.: PCT/SE2010/050366
§ 371 (c)(1),
(2), (4) Date: Oct. 3, 2011

(87) PCT Pub. No.: WO2010/114475
PCT Pub. Date: Oct. 7, 2010

(65) Prior Publication Data
US 2012/0027211 A1 Feb. 2, 2012

Related U.S. Application Data

(60) Provisional application No. 61/165,809, filed on Apr. 1, 2009.

(51) Int. Cl.
*H04K 1/00* (2006.01)
*H04L 29/06* (2006.01)
(Continued)

(52) U.S. Cl.
CPC ............ *H04L 63/062* (2013.01); *H04L 12/189* (2013.01); *H04W 12/04* (2013.01); *H04L 65/1016* (2013.01); *H04L 65/4076* (2013.01); *H04W 88/14* (2013.01)

(58) Field of Classification Search
CPC ..... H04L 63/061; H04L 63/06; H04L 63/062; H04L 65/1016; H04L 9/0838
See application file for complete search history.

(56) References Cited

U.S. PATENT DOCUMENTS 8,166,180 B2* 4/2012 Jalkanen et al. ............. 709/227
2006/0196931 A1 9/2006 Holtmanns et al.
(Continued)

FOREIGN PATENT DOCUMENTS

WO WO 2006/131849 A2 12/2006
WO WO 2007/034322 A1 3/2007
(Continued)

OTHER PUBLICATIONS

3GPP Organizational Partners, "TS33220-850", 2008, version 8.5.0, http://www.3gpp.org/ftp/SPecs/html-info/33220.htm.*
(Continued)

*Primary Examiner* — Amir Mehrmanesh
*Assistant Examiner* — Quy Pham

(57) ABSTRACT

A system, method, and nodes for managing shared security keys between a User Equipment, UE, an authentication node such as an SCF/NAF, and a service node such as a BM-SC or AS. The SCF/NAF allocates to each BM-SC, a different SCF/NAF identifier such as a fully qualified domain name, FQDN, from the FQDN space the SCF/NAF administers. The SCF/NAF then locally associates these allocated FQDNs with the connected BM-SCs and with different services. The network sends the correct FQDN to the UE in a service description for a desired service, and the UE is able to derive a security key using the FQDN. When the UE requests the desired service, the SCF/NAF is able to associate the service identifier with the correct FQDN and an associated BM-SC. The SCF/NAF uses the FQDN to obtain the security key from a bootstrapping server and sends it to the associated BM-SC. As a result, the UE and the associated BM-SC share a specific security key.

10 Claims, 8 Drawing Sheets

(51) Int. Cl.
*H04L 12/18* (2006.01)
*H04W 12/04* (2009.01)
*H04W 88/14* (2009.01)

(56) References Cited

U.S. PATENT DOCUMENTS

2007/0101122 A1* 5/2007 Guo .............................. 713/153
2009/0209232 A1* 8/2009 Cha et al. ...................... 455/411

FOREIGN PATENT DOCUMENTS

| WO | WO 2007/085186 A1 | 8/2007 |
| WO | WO 2009/046400 A1 | 4/2009 |
| WO | WO 2009/130796 A1 | 10/2009 |

OTHER PUBLICATIONS

3rd Generation Partnership Project: "3GPP TS 26.237 version 8.1.1 : Technical Specification Group Services and System Aspects; IP Mu ltimed i a SUbsystem (IMS) based Packet Switch Streaming (PSS) and Multimedia Broadcast/Multicast Service (MBMS) User Service; Protocols (Release 8)" [Online] Mar. 20, 2009, pp. 1-70, XP002601133.

Technical Specification, European Telecommunications Standards Institute (ETSI) , 650, Route Des Lucioles , F-06921 Sophia-Antipolis , France Retrieved from the Internet: URL:http://www.3gpp.org/ftp/Specs/archive/26_series/26.237/26237-811.zip> Section 10.4 and subsections.

* cited by examiner

SECURITY KEY MANAGEMENT IN IMS-BASED MULTIMEDIA BROADCAST AND MULTICAST SERVICES (MBMS)

RELATED APPLICATIONS

This application claims the benefit of U.S. Provisional Application No. 61/165,809 filed Apr. 1, 2009.

TECHNICAL FIELD

The present invention relates generally to communication networks, and in particular, to a system, method, and network node for managing shared security keys in the IP Multimedia Subsystem (IMS)-based Multimedia Broadcast/Multicast Service (MBMS) user service.

BACKGROUND

Existing procedures relating to the present invention are described in several Third Generation Partnership Project (3GPP) Technical Specifications. These include:

3GPP TS 33.220 v8.5.0 Technical Specification Group Services and System Aspects; Generic Authentication Architecture (GAA); Generic bootstrapping architecture (Release 8);

3GPP TS 33.222 v8.0.0 Technical Specification Group Services and System Aspects; Generic Authentication Architecture (GAA); Access to network application functions using Hypertext Transfer Protocol over Transport Layer Security (HTTPS) (Release 8);

3GPP TS 33.246 v8.2.0 Technical Specification Group Services and System Aspects; 3G Security; Security of Multimedia Broadcast/Multicast Service (MBMS) (Release 8); and 3GPP TS 26.237 v8.0.0 Technical Specification Group Services and System Aspects; IP Multimedia Subsystem (IMS) based Packet Switched Streaming (PSS) and Multimedia Broadcast/Multicast Service (MBMS) User Service; Protocols (Release 8).

FIG. 1 is a high-level reference model from TS 33.222 illustrating a Network Application Function (NAF) using a bootstrapping service. The network entities are defined in 3GPP TS 33.220, which specifies the Generic Bootstrapping Architecture (GBA) in which a mobile communication device such as a User Equipment (UE) 11 and a Bootstrapping Server Functionality (BSF) 12 run HTTP digest AKA over the Ub reference point and as a result establish a shared key Ks. The shared key Ks is later used to derive NAF-specific keys (called Ks_NAF keys) to secure communication between the UE and a NAF 13 over the Ua reference point. The NAF fetches the NAF-specific key over the Zn reference point.

3GPP TS 33.222 clause 6 specifies the use of an Authentication Proxy (AP) in the NAF 13. The AP is compatible with the GBA architecture specified in TS 33.220. When an AP is used in this architecture, the AP relieves the Application Server (AS) of security tasks by taking the role of a NAF.

FIG. 2 is a high-level reference model from TS 33.222 illustrating the environment and reference points of an Authentication Proxy (AP) 15. TS 33.222 assumes the use of Transport Layer Security (TLS) between the UE 11 and the AP 15 in the NAF 13. When an HTTPS request is destined towards an application server (AS) 16a-16n behind the AP, the AP terminates the TLS tunnel 17, fetches the NAF key (Ks_NAF) from the BSF 12, and performs UE authentication. The AP proxies the HTTP requests received from the UE to one or many ASs. The AP may add an assertion of identity of the subscriber for use by the AS, when the AP forwards the request from the UE to the AS.

A problem with the procedure defined in TS 33.222 for use of the NAF key is that the UE 11 and the ASs 16a-16n do not share any key material even though there could be cases where such shared key material would be needed. The AP 15 takes the role of a NAF 13 in TS 33.222. Therefore, the NAF key (Ks_NAF) is specific to the AP according to the key derivation rules specified in TS 33.220, and is not known by the UE.

FIG. 3 is a high-level reference model from TS 26.237 illustrating a current solution for key sharing. This problem defined above for use of the NAF key with the ASs is also applicable to the network entities defined in TS 26.237. In this case, the Service Control Function (SCF) 21 takes the role of a modified variant of an NAF/AP (and thus is labeled SCF/NAF), and the MBMS Broadcast/Multicast Service Center (BM-SC) 22 takes the role of an AS (and thus is labeled BM-SC/AS). Like the ASs in FIG. 2, the BM-SC/AS needs a shared key with the UE 11 in order to be able to send protected MIKEY key management messages directly from the BM-SC/AS to the UE over a unicast or broadcast channel.

It should be noted that TS 26.237 does not mention this analogy with the AP 15 and AS 16 of TS 33.222. The setting in TS 26.237 is not exactly the same as in TS 33.222; for example, a TLS tunnel between the UE 11 and SCF 21 is not necessarily used. However, similar problems remain.

In TS 26.237, a solution has been introduced in which the SCF 21 sends its own NAF key (Ks_NAF) to the BM-SC 22. The BM-SC uses the Ks_NAF as the MUK (MBMS User Key), which is used to protect the MIKEY key management messages from the BM-SC to the UE 11. Steps 1-6 of FIG. 3 are according to the current GBA procedures, and step 7 describes sending the Ks_NAF and an asserted identity of the subscriber to the BM-SC.

The current solution in TS 26.237 works fine as long as only one BM-SC 22 is connected to the SCF 21 (and as long as the SCF can assume enough trust towards the BM-SC so that the BM-SC does not misuse the SCF-specific NAF key). Problems arise when two or more BM-SCs are attached to the SCF. This is because according to the current solution, the SCF sends its own Ks_NAF to the BM-SC and therefore the SCF would send the same Ks_NAF to all the connected BM-SCs. It is not a good security practice to give the same key to several nodes. This would result in a situation where the same Ks_NAF key is used between the UE 11 and all related BM-SCs. This would open up threats such as the BM-SCs impersonating each other towards the UE.

FIG. 4 is a message flow diagram illustrating the messages sent between various network entities during an existing IMS-based MBMS registration procedure. The figure is based on the preconditions that the UE 11 has been registered and authenticated to IMS according to 3GPP TS 33.203; the UE has communicated with the Service Schedule Function (SSF) (not shown) and has received the list of available services as defined in 3GPP TS 26.237; the UE has run GBA bootstrapping with the BSF 12 as defined in 3GPP TS 33.220; and the network interfaces are protected with Network Domain Security (NDS/IP) as defined in 3GPP TS 33.210.

The procedure is as follows, with only relevant information on the security procedures shown. The UE 11 sends a SIP INVITE message 31 to the SCF 21 via the IP Multimedia Core Network (IM CN) subsystem 32. The INVITE message indicates "SCF" in the Request-URI and the message includes in an XML document in the SIP message body, the identities of the requested MBMS user services (userServiceIds) for which the UE wants to register. The XML document is the same as that used for MBMS Registration in TS 33.246, and it is specified in TS 26.346. Additionally, there is an XML document carrying a Bootstrapping Transaction Identifier (B-TID). The XML document carrying the B-TID is defined in Annex I of 3GPP TS 26.237.

The SCF 21 receives the IP address of the UE 11 and the asserted identity or identities of the UE from the headers of the SIP INVITE message 31. The SCF performs a check based on stored subscription information to determine whether the UE is authorized to access the requested MBMS user services. If the UE is authorized, the procedure continues; if not, the procedure is terminated. If there is no B-TID stored for the UE or if the received B-TID is different than the one stored for the UE, the SCF 21 runs a GBA usage procedure at 33 and 34 with the BSF 12 over the Zn reference point to fetch the NAF keys corresponding to the UE as defined in TS 33.220. The SCF derives the MBMS User Key (MUK) from the NAF key as defined in TS 33.246.

The SCF 21 sends an HTTP POST message 35 to the BM-SC 22. The SCF populates the HTTP POST message as follows:
the HTTP version shall be 1.1 which is specified in RFC 2616;
the base of the Request-URI shall contain the full BM-SC key management URI (e.g., http://bmsc.home1.net:1234);
the Request-URI shall contain a URI parameter "request-type" that shall be set to "authorized-register", i.e., the Request-URI takes the form of "/keymanagement?requesttype=authorized-register";
the SCF may add additional URI parameters to the Request-URI;
X-3GPP-Asserted-Identity header, which includes the identities of the UE;
the HTTP header Content-Type shall be the MIME type of the payload, i.e., "application/mbms-authorized-register+xml";
the HTTP payload shall contain an XML document including a list of one or more userServiceIds of MBMS User Services to which the UE wants to register, IP address of the UE, MEMS user key (MUK), and lifetime of the MUK. The XML schema of the payload is specified in Annex I of 3GPP TS 26.237
the SCF may add additional HTTP headers to the HTTP POST request.

The BM-SC 22 receives the HTTP POST message 35, verifies that the HTTP POST is valid, and extracts the request for further processing. Since the HTTP POST message came from the SCF 21 with asserted identities, the BM-SC does not need to authenticate the UE 11 because the UE has been authenticated by the IMS. Additionally, the HTTP POST message also indicates to the BM-SC that the SCF has authorized the UE to register to the indicated MBMS User Services.

The BM-SC stores the received information and returns an HTTP 200 OK message 36 to the SCF 21. The BM-SC shall populate HTTP 200 OK message as follows:
the HTTP status code in the HTTP status line shall be 200;
the HTTP header Content-Type shall be the MIME type of the payload, i.e., "application/mbms-register-response+xml";
the HTTP payload shall contain an XML document that includes a list including one status code for each MBMS User Service. The XML schema of the payload is the same that is used for MBMS Registration in TS 33.246, and it is specified in TS 26.346.

The SCF 21 receives the HTTP 200 OK message 36 and includes the XML body from the HTTP 200 OK message into a SIP 200 OK message 37 and sends the SIP 200 OK message to the UE 11 via the IM CN subsystem 32. The BM-SC 22 can now start sending MIKEY MSK messages (protected with MUK) 38, MTK messages (protected with MSK) 39, and MBMS Data (protected with MTK) 40 to the UE for the indicated MBMS User Services according to procedures specified in TS 33.246.

The problem with this procedure is the same as that discussed above with respect to FIG. 3, that is, there is no way to provide BM-SC-specific NAF keys if more than one BM-SC is connected to the SCF. If the SCF 21 sends the same Ks_NAF to all the connected BM-SCs, the same Ks_NAF key would be used between the UE 11 and all related BM-SCs. This would open up threats such as the BM-SCs impersonating each other towards the UE.

Additionally, there is not enough information in the MIKEY MSK message 38 to indicate to the UE 11 which MUK (i.e., NAF key) was used to protect the MIKEY MSK message. In MBMS TS 33.246, the NAF-Id and B-TID are used to indicate this; but in TS 26.237, the BM-SC 22 does not act as a NAF and therefore it does not have this information.

SUMMARY

In one embodiment of the present invention, the SCF/NAF 21 fetches Ks_NAF from the BSF 12 as usual in the GBA. Then instead of the SCF/NAF sending its own Ks_NAF key to the (one or more) BM-SC/ASs, the SCF/NAF makes further key derivations to produce BM-SC/AS-specific keys Ks_AS from the SCF-specific Ks_NAF. For example, Ks_AS=KDF (Ks_NAF, nonce), where the nonce is a value defined by the SCF/NAF and specific to the related BM-SC/AS. The SCF/NAF indicates the nonce to the UE 11, which can then make the same Ks_AS derivation. The SCF/NAF also indicates the identity of the BM-SC/AS to the UE so that the UE can correlate the derived Ks_AS keys to the correct BM-SC/AS. As a result, the UE and the BM-SC/ASs share BM-SC/AS-specific keys.

In one embodiment, the present invention is directed to a method in a communication network for managing shared security keys between a communication device, an authentication node, and a selected service node that provides a requested service to the communication device. The method includes the steps of associating by the authentication node, a plurality of authentication node identifiers with a plurality of services, wherein the plurality of authentication node identifiers identify the authentication node; and making a service description for a desired service available by the network to the communication device, the service description including one of the plurality of authentication node identifiers which is associated with the desired service, wherein the authentication node identifier enables the communication device to derive a security key. The method also includes allocating by the authentication node, a different one of the plurality of authentication node identifiers to each service node in the network; and associating by the authentication node, the allocated authentication node identifiers with connected service nodes. Upon receiving a request for the desired service from the communication device, the authentication node utilizes the allocated authentication node identifier associated with the desired service to obtain the security key for a connected service node associated with the allocated authentication node identifier, and sends the security key from the authentication node to the associated service node. As a result, when the associated service node sends a key management message protected with the security key to the communication device, the communication device decrypts and verifies the message using the security key.

In another embodiment, the present invention is directed to a method in a communication network for managing shared security keys between a communication device, an authentication node, and a selected service node that provides a requested service to the communication device. The method includes the steps of making a service description for at least one service available by the network to the communication device, the service description including at least one identifier for the authentication node, wherein each authentication node identifier is associated with a different service and with a different service node; deriving a security key by the communication device based on known information and a selected one of the authentication node identifiers received in the service description, wherein the selected authentication node identifier is associated with a desired service; and sending a request for the desired service from the communication device to the authentication node, the request including a transaction identifier and a service identifier for the desired service. The method also includes associating the service identifier with an authentication node identifier in the authentication node; utilizing the authentication node identifier and the transaction identifier by the authentication node to obtain the security key; identifying the service node associated with the authentication node identifier; and sending a request message for the desired service from the authentication node to the identified service node, the request message including the service identifier, transaction identifier, security key, and an address for the communication device. As a result, when the identified service node sends a key management message protected with the security key to the communication device, the communication device decrypts and verifies the message using the security key.

In another embodiment, the present invention is directed to an authentication node in a communication network for managing shared security keys between a communication device and a service node that provides services to the communication device. The authentication node includes a processor running computer program instructions stored in a memory, the processor controlling the following components of the authentication node: means for associating a plurality of authentication node identifiers with a plurality of services, wherein the plurality of authentication node identifiers identify the authentication node; means for allocating a different one of the plurality of authentication node identifiers to each service node in the network; a table for associating the allocated authentication node identifiers with connected service nodes; means, responsive to receiving a request for a desired service from the communication device, for utilizing the allocated authentication node identifier associated with the desired service to obtain a security key for a connected service node associated with the allocated authentication node identifier; and communication means for sending the security key from the authentication node to the associated service node. The network makes a service description for the desired service available to the communication device. The service description includes one of the plurality of authentication node identifiers which is associated with the desired service, and the communication device utilizes the authentication node identifier to derive the security key. As a result, when the associated service node sends a key management message protected with the security key to the communication device, the communication device decrypts and verifies the message using the security key.

In another embodiment, the present invention is directed to a service node in a communication network for providing user services to a communication device utilizing a shared security key. The service node includes a processor running computer program instructions stored in a memory. The processor controls the following components of the service node: communication means for obtaining from an authentication node, an authentication node identifier, an IP address of the communication device, a transaction identifier, and the shared security key, wherein the transaction identifier identifies a transaction in which the communication device has requested a user service provided by the service node; and communication means for sending to the communication device a key management message protected with the shared security key, the key management message including the authentication node identifier and the transaction identifier. When the communication device receives the key management message from the service node, the communication device identifies the shared security key from the authentication node identifier and the transaction identifier. When the authentication node provides the authentication node identifier to the communication device, or when the communication device receives the authentication node identifier in a service description, the communication device derives the shared security key utilizing the authentication node identifier, and decrypts and verifies the key management message using the shared security key.

In another embodiment, the present invention is directed to a system in a communication network for managing shared security keys. The system includes a communication device; an authentication node in communication with the communication device; and a service node in communication with the authentication node and the communication device. The authentication node includes means for associating a plurality of authentication node identifiers with a plurality of services, wherein the plurality of authentication node identifiers identify the authentication node; means for allocating a selected one of the plurality of authentication node identifiers to the service node; a table for associating the allocated authentication node identifiers with connected service nodes; means, responsive to receiving a request for a desired service from the communication device, for utilizing the allocated authentication node identifier associated with the desired service to obtain a security key for a connected service node associated with the allocated authentication node identifier; and communication means for sending to the service node, the authentication node identifier, an IP address of the communication device, a transaction identifier, and the shared security key, wherein the transaction identifier identifies a transaction in which the communication device has requested a user service provided by the service node. The service node includes communication means for sending to the communication device a key management message protected with the shared security key, the key management message including the authentication node identifier and the transaction identifier. The mobile communication device includes means for identifying the shared security key from the authentication node identifier and the transaction identifier; communication means for receiving the authentication node identifier either from the authentication node or in a service description obtained from the network; means for deriving the shared security key utilizing the authentication node identifier; and means for decrypting and verifying the key management message using the shared security key.

In a specific exemplary embodiment for key distribution in IMS-based MBMS and PSS user services, the present invention advantageously provides a more secure system in which a UE shares different (specific) keys with each of a plurality of BM-SCs instead of sharing the same key with all involved BM-SCs. In a related embodiment for obtaining AS-specific keys for an Authentication Proxy (AP) scenario, the present invention advantageously provides a way to implement a shared secret between the UE and the Application Server (ASs). This enables new kinds of applications to be developed for scenarios with an AP. The invention provides a more secure system in which the UE shares different (specific) keys with each AS instead of sharing the same key with all involved ASs.

DETAILED DESCRIPTION

There are two ways that the NAF-Id to be used in key derivation can be indicated to the UE:
A) The NAF-Id (SCF allocated FQDN) may be indicated to the UE in the service description. Based on which service the UE chooses, the UE will then use the corresponding NAF-Id. This is similar to current procedures in MBMS TS 33.246, but there the BM-SC FQDN is indicated.
B) The SCF may indicate the NAF-Id (SCF allocated FQDN) to the UE within the SIP INVITE procedure since the UE does not need to use the NAF-Id before the SIP INVITE procedure has ended. This alternative has the advantage that the SCF can dynamically allocate BM-SCs to users when service requests are received. This could be beneficial, for example, in load balancing.

Figure 1:
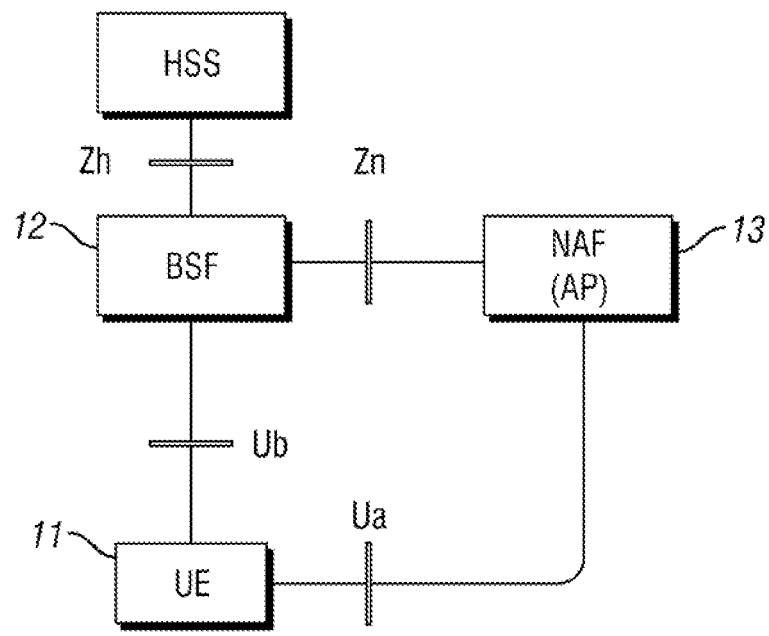
FIG. 1 is a high-level reference model from TS 33.222 illustrating a Network Application Function (NAF) using a bootstrapping service.
Figure 2:
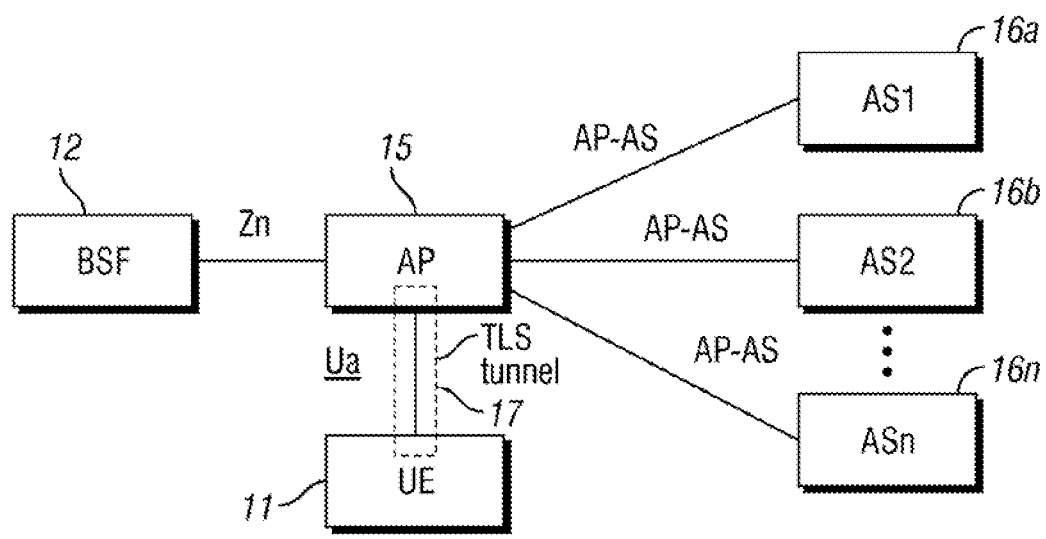
FIG. 2 is a high-level reference model from TS 33.222 illustrating the environment and reference points of an Authentication Proxy (AP)
Figure 3:
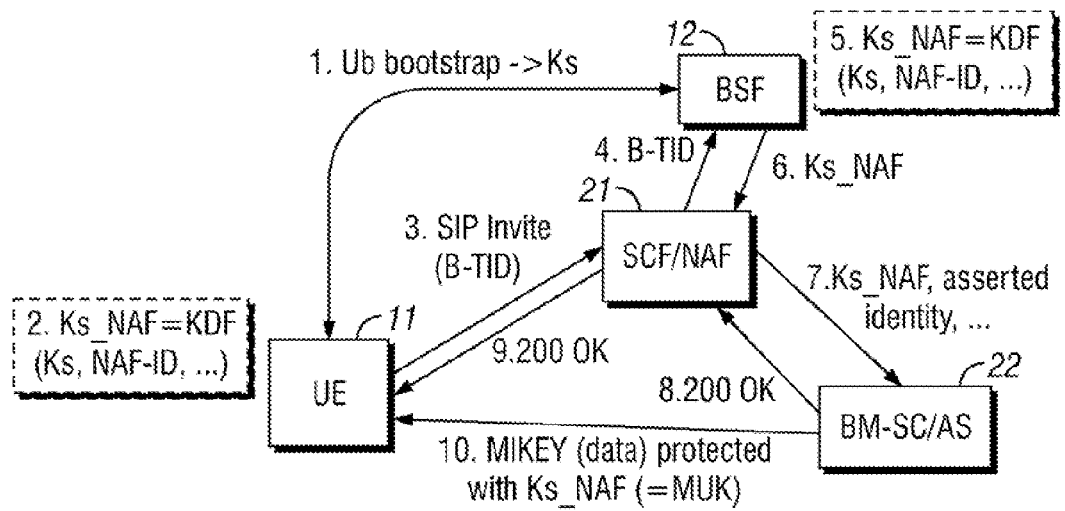
FIG. 3 is a high-level reference model from TS 26.237 illustrating a current solution for key sharing.
Figure 4:
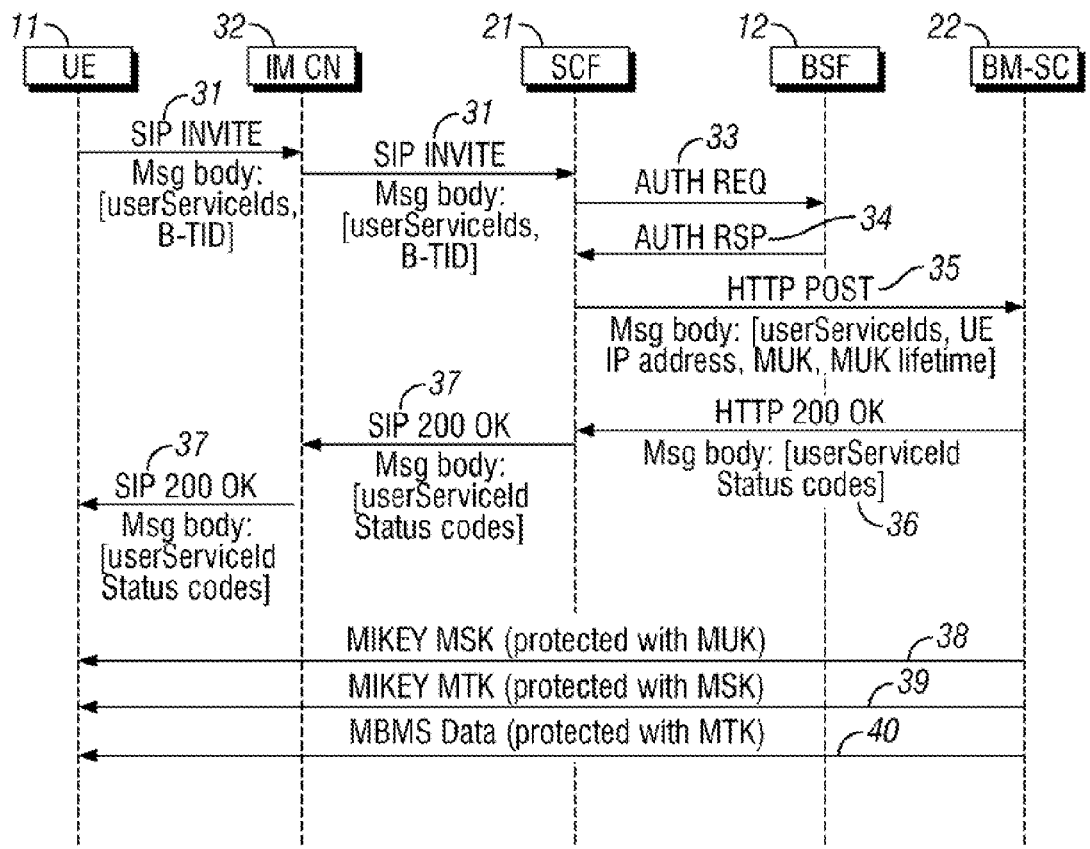
FIG. 4 is a message flow diagram illustrating the messages sent between various network entities during an existing IMS-based MBMS registration procedure.
Figure 5A:
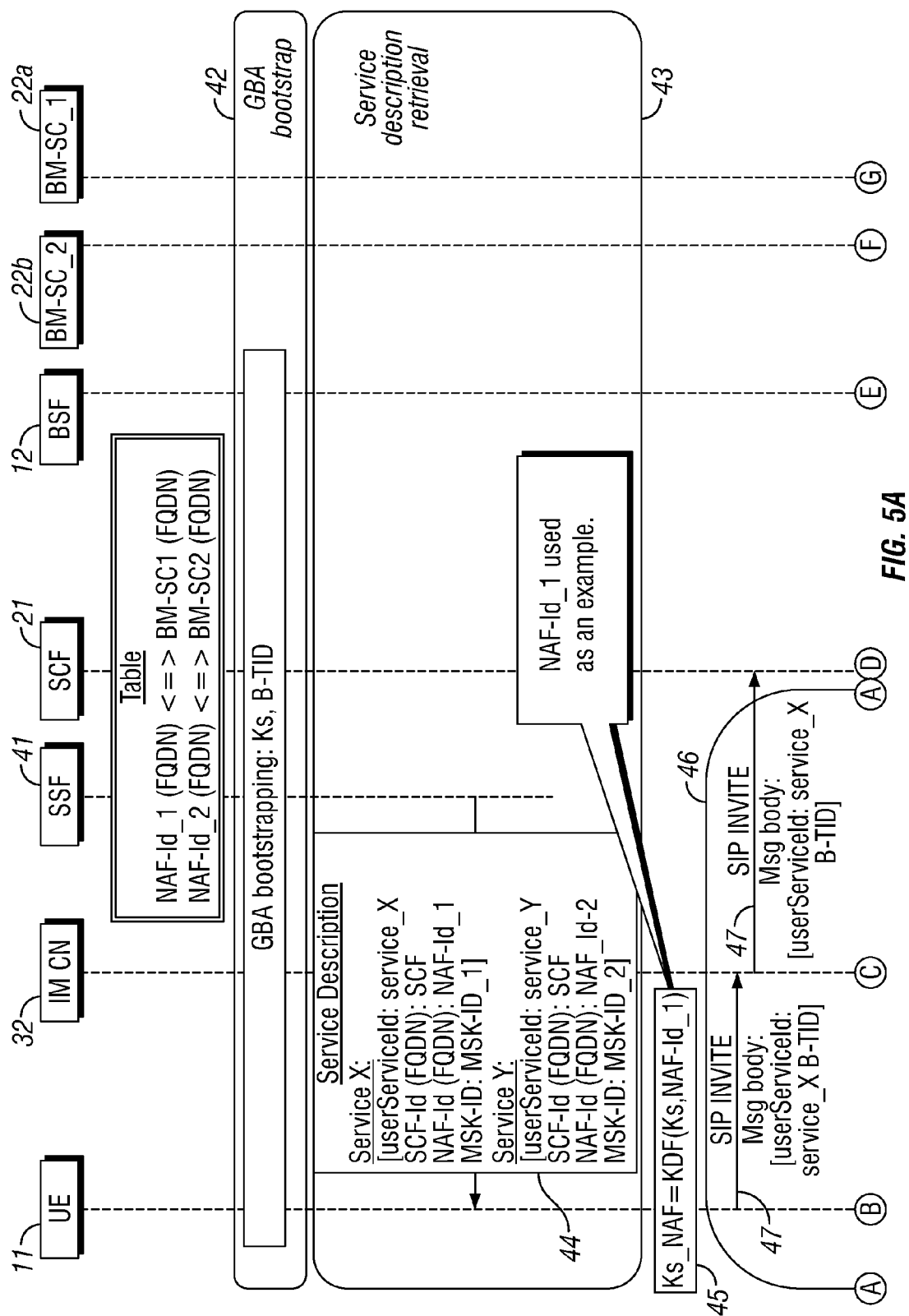
FIGS. 5A-5B are portions of a message flow diagram illustrating the messages sent between various network entities during a first embodiment of an inventive IMS-based MBMS registration procedure when the NAF-Id (SCF allocated FQDN) is indicated to the UE in the service description.
Figure 5B:
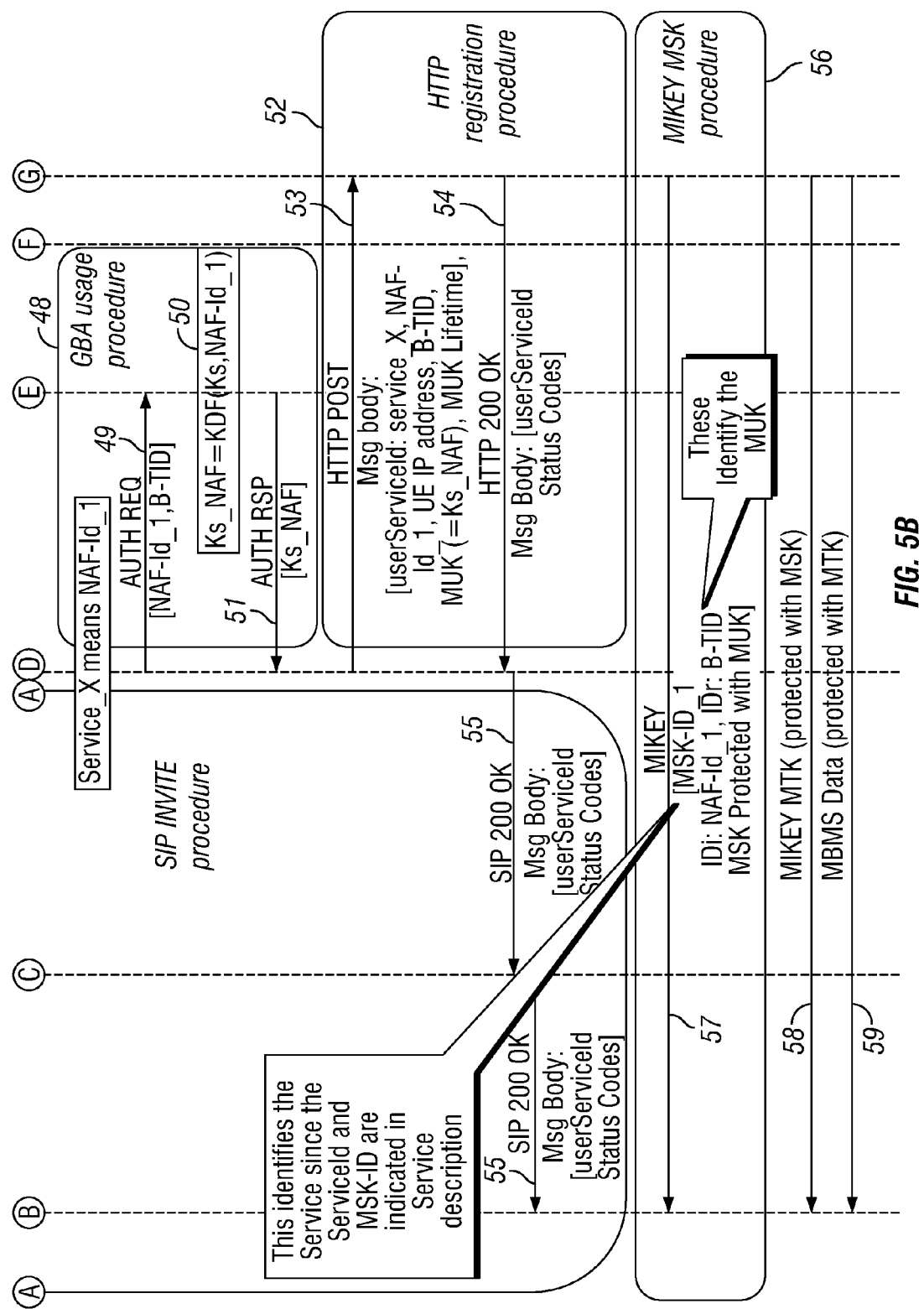

FIGS. 5A-5B are portions of a message flow diagram illustrating the messages sent between various network entities during an inventive IMS-based MBMS registration procedure when the NAF-Id (SCF allocated FQDN) is indicated to the UE 11 in the service description (i.e., Alternative A above). The figure is based on the preconditions that the UE has been registered and authenticated to IMS according to 3GPP TS 33.203; the SIP procedures are protected by IMS security as defined in 3GPP TS 33.203; the UE has run GBA bootstrapping with the BSF 12 as defined in 3GPP TS 33.220; and the network interfaces are protected with Network Domain Security (NDS/IP) as defined in 3GPP TS 33.210.

In addition, the SCF 21 has created connections to one or more BM-SCs 22a, 22b which provide the actual MBMS user service to the UEs. Differently from MBMS security defined in TS 33.246, where the BM-SC acts as NAFs, the SCF acts as a NAF on behalf of the BM-SC(s). The BSF 12 uses the NAF-Id (which includes the FQDN of the NAF and Ua security protocol identifier) as input to the NAF key derivation. In order to get BM-SC-specific NAF keys from the BSF, the SCF allocates a separate FQDN (from the FQDN space it administers) for each BM-SC. The SCF locally associates these allocated FQDNs to the connected BM-SCs, for example in a table.

These allocated separate FQDNs are needed for two reasons. First, the SCF 21 cannot use the same (e.g., its own) FQDN since two BM-SCs would then get the same NAF key, which could endanger the security of the system. Second, the SCF cannot use the FQDNs of the BM-SCs because the BSF 12 will check to determine whether the NAF is entitled to use the NAF-Id that the NAF is offering. As an example, the SCF could allocate NAF-Ids for BM-SC_1 22a and BM-SC_2 22b as follows:

NAF-Id_1 (FQDN)<=>BM-SC1 (FQDN)

NAF-Id_2 (FQDN)<=>BM-SC2 (FQDN)

where, for example, NAF-Id_1 may be server1.scf.operatorA.com and BM-SC1 may be bmsc123.operatorB.com, Referring to FIG. 5A, following the GBA bootstrap procedure 42, a service description retrieval procedure 43 is performed. The UE 11 communicates with the SSF 41 and retrieves the service description 44, i.e., the list of available services and their parameters such as the service protection description. The service protection description is similar to that defined in TS 33.246 except that the SCF-allocated FQDNs are included instead of the BM-SC FQDNs. It is assumed that the FQDN of the SCF 21 is needed here also so that the UE knows where to send the SIP INVITE message 47.

At 45, the user chooses a service from the service description and derives NAF keys corresponding to the NAF-Id indicated for the chosen service in the service description. Alternatively, the NAF key derivation may be performed after the SIP INVITE procedure 46.

The UE 11 sends a SIP INVITE message 47 to the SCF 21 via the IM CN subsystem 32. The INVITE message indicates the SCF in the Request-URI, and the message includes in an XML document in the SIP message body, the identities of the requested MBMS user services (userServiceIds) for which the UE wants to register. The XML document is the same as that utilized for MBMS Registration in TS 33.246, and it is specified in TS 26.346. Additionally, there is an XML document carrying the bootstrapping transaction identifier (B-TID). The XML document carrying the B-TID is defined in Annex I of 3GPP TS 26.237.

The SCF 21 receives the IP address of the UE 11 and the asserted identity or identities of the UE from the headers of the SIP INVITE message 47. The SCF performs a check based on stored subscription information to determine whether the UE is authorized to access the requested MBMS user services. If yes, the procedure continues. If not, the procedure is terminated.

Referring to FIG. 5B, if there is no B-TID stored for the UE or if the received B-TID is different than the one stored for the UE, the SCF runs a GBA usage procedure 48 with the BSF 12 over the Zn reference point to fetch the NAF key corresponding to the UE as defined in TS 33.220. The SCF sends an authorization request message 49 to the BSF and includes the NAF-Id, which is indicated in the service description for this service. The BSF uses the NAF-Id to derive the NAF key at 50 and then returns the NAF key in an authorization response message 51. The SCF then derives the MUK from the NAF key as defined in TS 33.246. It should be noted that a new Ua security protocol needs to be registered in 3GPP TS 33.220 for this purpose.

Then, in an HTTP registration procedure 52, the SCF 21 sends a HTTP POST message 53 to the BM-SC (in the illustrated case, to BM-SC_1 22a). The SCF populates the HTTP POST message as follows:

the HTTP version shall be 1.1, which is specified in RFC 2616;

the base of the Request-URI shall contain the full BM-SC key management URI (e.g., http://bmsc.home1.net:1234);

the Request-URI shall contain an URI parameter "request-type" that shall be set to "authorized-register", i.e., the Request-URI takes the form of "/keymanagement?requesttype=authorized-register";

the SCF may add additional URI parameters to the Request-URI;

X-3GPP-Asserted-Identity header, which includes the identities of the UE;

the HTTP header Content-Type shall be the MIME type of the payload, i.e., "application/mbms-authorized-register+xml";

the HTTP payload shall contain an XML document including a list of one or more userServiceIds of MBMS User Services to which the UE wants to register, IP address of the UE, MBMS user key (MUK), lifetime of the MUK, NAF-Id, and B-TID. The NAF-Id and B-TID are included because they are further included in the MIKEY message from the BM-SC to the UE to identify which MUK (i.e., NAF key) was used. The XML schema of the payload is specified in Annex I of 3GPP TS 26.237.

the SCF may add additional HTTP headers to the HTTP POST request message.

The BM-SC_1 22a receives the HTTP POST message 53, verifies that the HTTP POST message is valid, and extracts the request for further processing. Since the HTTP POST message came from the SCF 21 with asserted identities, the BM-SC_1 does not need to authenticate the UE 11 because the UE has been authenticated by the IMS. Additionally, the HTTP POST message also indicates to the BM-SC_1 that the SCF has authorized the UE to register to the indicated MBMS User Services.

The BM-SC_1 stores the received information and returns an HTTP 200 OK message 54 to the SCF 21. The BM-SC_1 shall populate the HTTP 200 OK message as follows:

the HTTP status code in the HTTP status line shall be 200;

the HTTP header Content-Type shall be the MIME type of the payload, i.e., "application/mbms-register-response+xml";

the HTTP payload shall contain an XML document that includes a list including one status code for each MBMS User Service. The XML schema of the payload is the same that is used for MBMS Registration in TS 33.246, and it is specified in TS 26.346.

The SCF 21 receives the HTTP 200 OK message 54 and includes the XML body from the HTTP 200 OK message into a SIP 200 OK message 55 and sends the SIP 200 OK message to the UE 11 via the IM CN subsystem 32. In a MIKEY MSK procedure 56, the BM-SC_1 22a can now start sending MIKEY MSK messages (protected with MUK) 57, MTK messages (protected with MSK) 58, and MBMS Data (protected with MTK) 59 to the UE for the indicated MBMS User Services according to procedures specified in TS 33.246. In the MIKEY MSK message 57, the BM-SC shall use the NAF-Id (FQDN) and B-TID received from the SCF 21 in the HTTP POST message 53.

Figure 6A:
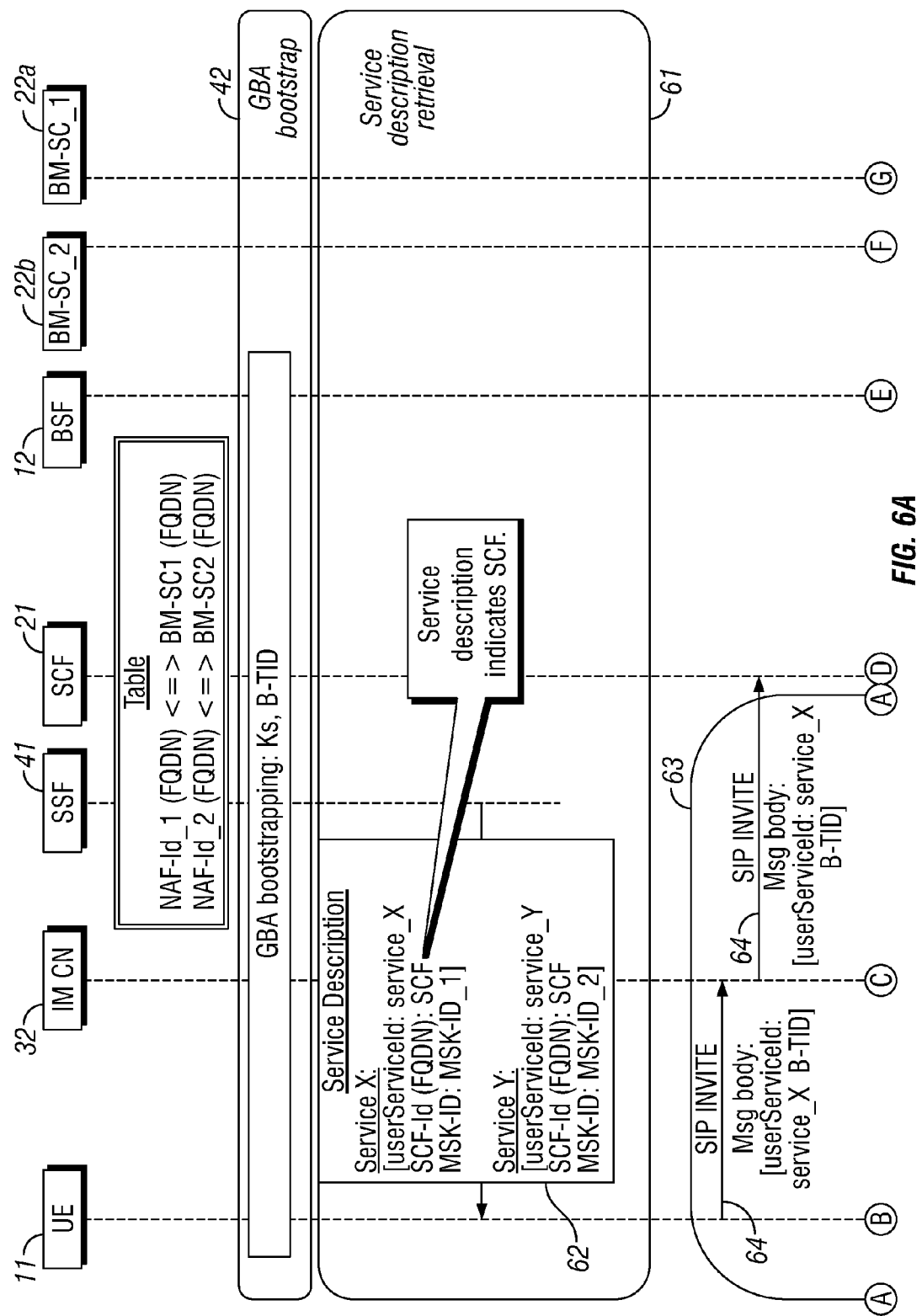
FIGS. 6A-6B are portions of a message flow diagram illustrating the messages sent between various network entities during a second embodiment of an inventive IMS-based MBMS registration procedure when the NAF-Id (SCF allocated FQDN) is indicated to the UE in a SIP 200 OK message.
Figure 6B:
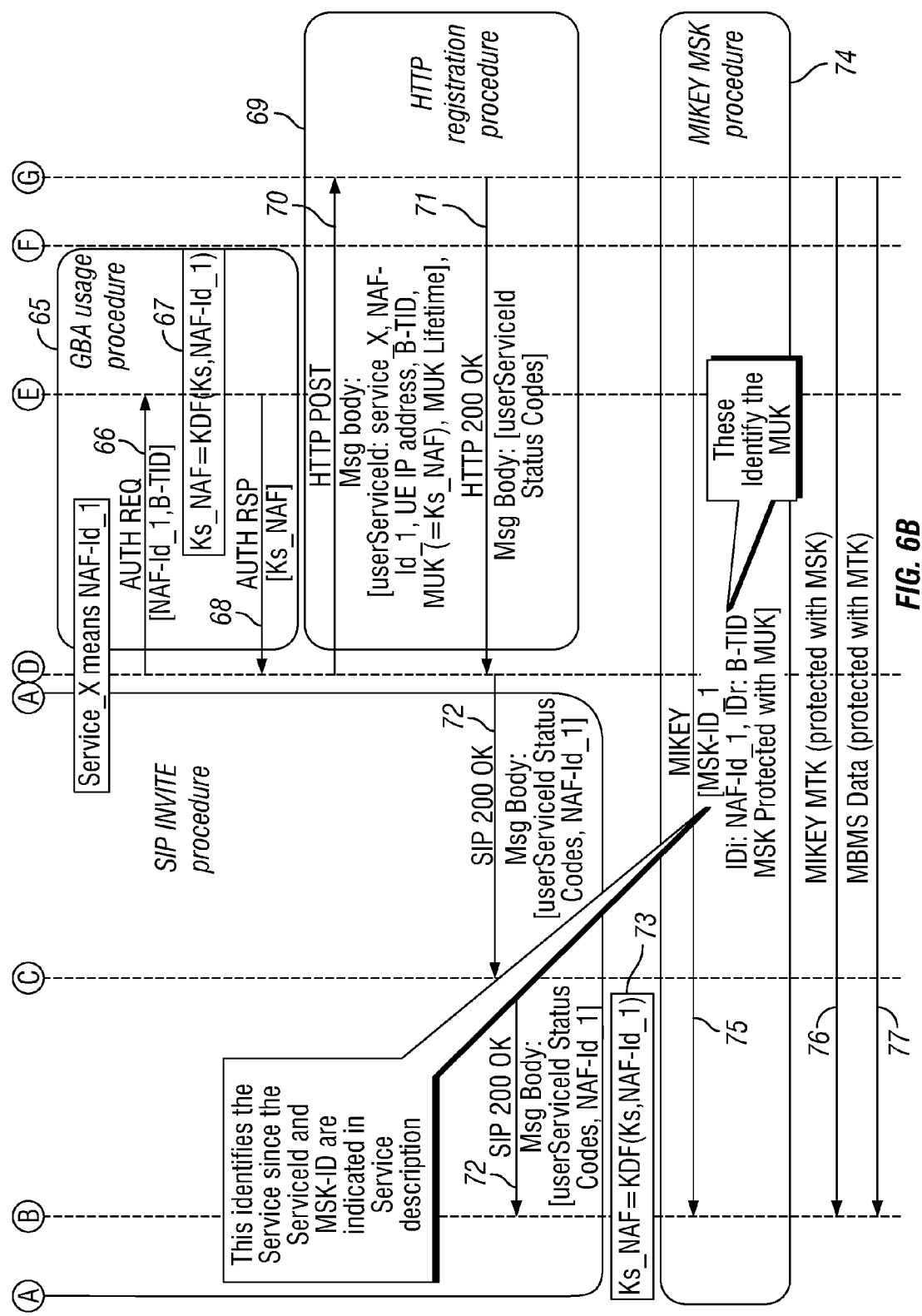

FIGS. 6A-6B are portions of a message flow diagram illustrating the messages sent between various network entities during an embodiment of an inventive IMS-based MBMS registration procedure when the NAF-Id (SCF allocated FQDN) is indicated to the UE 11 in the SIP 200 OK message (i.e., Alternative B above). The same preconditions apply as described for FIGS. 5A-5B above.

Referring to FIG. 6A, following the GBA bootstrap procedure 42, a service retrieval procedure 61 is performed. The UE 11 communicates with the SSF 41 and retrieves the service description 62, i.e., the list of available services and their parameters such as the service protection description. The service protection description is similar to that defined in TS 33.246 except that the included FQDNs point to the SCF 21 instead of the BM-SC FQDNs. It is assumed that the FQDN of the SCF 21 is needed here also so that the UE knows where to send the SIP INVITE message 47. The user then chooses a service from the service description.

In a SIP INVITE procedure 63, the UE 11 sends a SIP INVITE message 64 to the SCF 21 via the IM CN subsystem 32. The INVITE message indicates the SCF in the Request-URI, and the message includes in an XML document in the SIP message body, the identities of the requested MBMS user services (userServiceIds) for which the UE wants to register. The XML document is the same as that utilized for MBMS Registration in TS 33.246, and it is specified in TS 26.346. Additionally, there is an XML document carrying the bootstrapping transaction identifier (B-TID). The XML document carrying the B-TID is defined in Annex I of 3GPP TS 26.237.

The SCF 21 receives the IP address of the UE 11 and the asserted identity or identities of the UE from the headers of the SIP INVITE message 64. The SCF performs a check based on stored subscription information to determine whether the UE is authorized to access the requested MBMS user services. If yes, the procedure continues. If not, the procedure is terminated.

Referring to FIG. 6B, if there is no B-TID stored for the UE or if the received B-TID is different than the one stored for the UE, the SCF runs a GBA usage procedure 65 with the BSF 12 over the Zn reference point to fetch the NAF key corresponding to the UE as defined in TS 33.220. The SCF sends an authorization request message 66 to the BSF and includes the NAF-Id that the SCF has allocated for this service. The BSF uses the NAF-Id to derive the NAF key at 67 and then returns the NAF key in an authorization response message 68. The SCF then derives the MUK from the NAF key as defined in TS 33.246. It should be noted that a new Ua security protocol needs to be registered in 3GPP TS 33.220 for this purpose.

Then, in an HTTP registration procedure 69, the SCF 21 sends a HTTP POST message 70 to the BM-SC (in the illustrated case, to BM-SC_1 22a). The SCF populates the HTTP POST message as follows:

the HTTP version shall be 1.1, which is specified in RFC 2616;

the base of the Request-URI shall contain the full BM-SC key management URI (e.g., http://bmsc.home1.net:1234);

the Request-URI shall contain a URI parameter "request-type" that shall be set to "authorized-register", i.e., the Request-URI takes the form of "/keymanagement?requesttype=authorized-register";

the SCF may add additional URI parameters to the Request-URI;

X-3GPP-Asserted-Identity header, which includes the identities of the UE;

the HTTP header Content-Type shall be the MIME type of the payload, i.e., "application/mbms-authorized-register+xml";

the HTTP payload shall contain an XML document including a list of one or more userServiceIds of MBMS User Services to which the UE wants to register, IP address of the UE, MBMS user key (MUK), lifetime of the MUK, NAF-Id, and B-TID. The NAF-Id and B-TID are included because they are further included in the MIKEY message from the BM-SC to the UE to identify which MUK (i.e., NAF key) was used. The XML schema of the payload is specified in Annex I of 3GPP TS 26.237.

the SCF may add additional HTTP headers to the HTTP POST request message.

The BM-SC_1 22a receives the HTTP POST message 70, verifies that the HTTP POST message is valid, and extracts the request for further processing. Since the HTTP POST message came from the SCF 21 with asserted identities, the BM-SC_1 does not need to authenticate the UE 11 because the UE has been authenticated by the IMS. Additionally, the HTTP POST message also indicates to the BM-SC_1 that the SCF has authorized the UE to register to the indicated MBMS User Services.

The BM-SC_1 stores the received information and returns an HTTP 200 OK message 71 to the SCF 21. The BM-SC_1 shall populate the HTTP 200 OK message as follows:

the HTTP status code in the HTTP status line shall be 200;

the HTTP header Content-Type shall be the MIME type of the payload, i.e., "application/mbms-register-response+xml";

the HTTP payload shall contain an XML document that includes a list including one status code for each MBMS User Service. The XML schema of the payload is the same that is used for MBMS Registration in TS 33.246, and it is specified in TS 26.346.

The SCF 21 receives the HTTP 200 OK message 71 and includes the XML body from the HTTP 200 OK message and the used NAF-Id into a SIP 200 OK message 72 and sends the SIP 200 OK message to the UE 11 via the IM CN subsystem 32. When the UE receives the SIP 200 OK message, the UE uses the received NAF-Id at 73 to derive NAF keys corresponding to the service and derives the MUK as defined in TS 33.246.

In a MIKEY MSK procedure 74, the BM-SC_1 22a can now start sending MIKEY MSK messages (protected with MUK) 75, MTK messages (protected with MSK) 76, and MBMS Data (protected with MTK) 77 to the UE for the indicated MBMS User Services according to procedures specified in TS 33.246. In the MIKEY MSK message 75, the BM-SC shall use the NAF-Id (FQDN) and B-TID received from the SCF 21 in the HTTP POST message 70.

Figure 7:
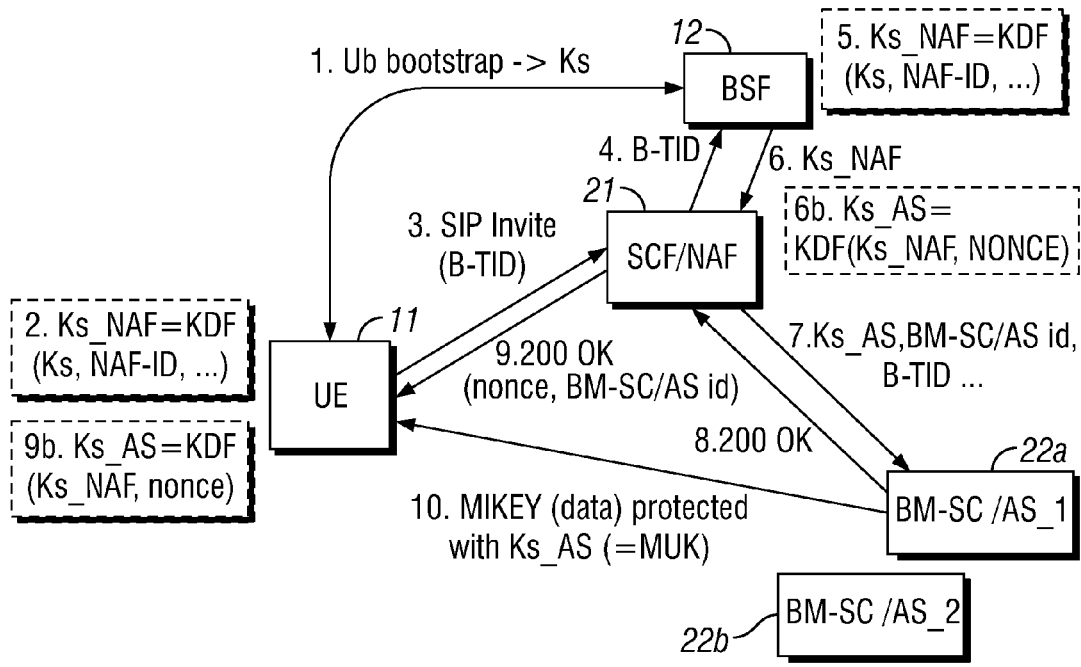
FIG. 7 is a high-level reference model illustrating an embodiment of an inventive system and method for key distribution in IMS-based MBMS and PSS user services.

FIG. 7 is a high-level reference model illustrating a first embodiment of an inventive system and method for key distribution in IMS-based MBMS and PSS user services. At step 1, the UE 11 and BSF 12 run GBA bootstrapping procedures as defined in TS 33.220. The result is a key Ks and a B-TID. At step 2, the UE derives NAF-specific key material (Ks_NAF) as defined in TS 33.220. At step 3, the UE initiates a Session Initiation Protocol (SIP) session by sending a SIP INVITE message (B-TID included) to the SCF 21 (which acts as a NAF). At step 4, the SCF requests Ks_NAF from the BSF using the B-TID. At step 5, the BSF derives NAF-specific key material (Ks_NAF) as defined in TS 33.220. At step 6, the BSF sends the Ks_NAF to the SCF.

At a new step 6b, the SCF 21 determines which BM-SC should receive the request. This information may be available from the UE's request or the SCF may makes a local decision based on its local policy. The SCF derives a BM-SC-specific key Ks_AS from the Ks_NAF and a nonce using a key derivation function such as Ks_AS=KDF(Ks_NAF, nonce). The nonce may be, for example, the identity of the BM-SC such as a Fully Qualified Domain Name (FQDN), a (pseudo)random value chosen by the SCF, or some other value usable as a nonce.

At step 7, the SCF 21 sends the Ks_AS and the identity of the BM-SC (e.g., FQDN) in an HTTP request to the identified BM-SC 22a. Other information specified in CR S4-090148 is also sent in the request (except the Ks_NAF is replaced by Ks_AS). It should be noted that the B-TID and FQDN of the BM-SC 22a are sent to the BM-SC so that the BM-SC can include these in the ID payloads of the MIKEY message to the UE 11. The UE will use these to identify the correct MUK, i.e. Ks_AS. Sending the FQDN from the SCF to the BM-SC makes it possible for the BM-SC to be known with different FQDNs towards the UE and the SCF. Therefore, it needs to be ensured that the BM-SC sends the same FQDN to the UE that the BM-SC received from the SCF.

At step 8, the BM-SC 22a stores the information and acknowledges the HTTP request with a SIP 200 OK message to the SCF 21. At step 9, the SCF sends a SIP 200 OK message to the UE 11. The 200 OK message includes the nonce and the identity of the BM-SC. These two may be the same value if the FQDN is used as the nonce. At step 9b, the UE derives the BM-SC-specific key Ks_AS from the Ks_NAF and the nonce using a key derivation function such as Ks_AS=KDF (Ks_NAF, nonce). The UE stores the key Ks_AS with the BM-SC identity. Finally at step 10, the BM-SC 22a sends a MIKEY key management message protected with Ks_AS as a MUK to the UE (see TS 33.246). The BM-SC includes the BM-SC FQDN and B-TID received from the SCF 21 in the ID payloads of the MIKEY message. The UE 11 is then able to decrypt and verify the message using Ks_AS. The UE uses the ID payloads of the MIKEY message to identify the correct MUK (i.e. Ks_AS).

Figure 8:
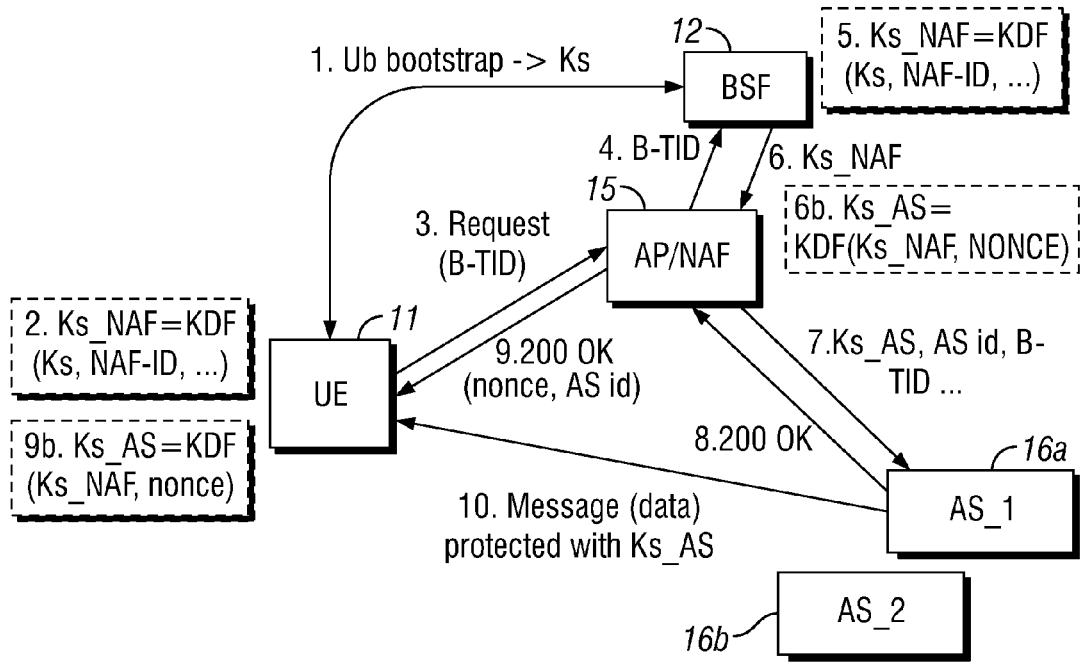
FIG. 8 is a high-level reference model illustrating an embodiment of an inventive system and method for obtaining AS-specific keys for an Authentication Proxy (AP) scenario.

FIG. 8 is a high-level reference model illustrating a second embodiment of an inventive system and method for obtaining AS-specific keys for an Authentication Proxy (AP) scenario. This embodiment is intended for a general AP-AS scenario in which several ASs 16a and 16b may reside behind an AP 15. A TLS tunnel may be set up between the UE 11 and the AP 15, but the tunnel is not relevant to the invention.

At step 1, the UE 11 and BSF 12 run GBA bootstrapping procedures as defined in TS 33.220. The result is a key Ks and a B-TID. At step 2, the UE derives NAF-specific key material (Ks_NAF) as defined in TS 33.220. At step 3, the UE sends an HTTP request (B-TID included) to the AP (which acts as a NAF). At step 4, the AP requests Ks_NAF from the BSF using the B-TID. At step 5, the BSF derives NAF-specific key material (Ks_NAF) as defined in TS 33.220. At step 6, the BSF sends the Ks_NAF to the AP.

At a new step 6b, the AP 15 determines which AS should receive the request. This information may be available from the UE's request or the AP may makes a local decision based on its local policy. The AP derives an AP-specific key Ks_AS from the Ks_NAF and a nonce using a key derivation function such as Ks_AS=KDF (Ks_NAF, nonce). The nonce may be, for example, the identity of the AS such as an FQDN, a (pseudo)random value chosen by the AP, or some other value usable as a nonce.

At step 7, the AP 15 sends the Ks_AS and the identity of the AS (e.g., FQDN) in an HTTP request to the identified AS 16a. It should be noted that the AP needs to send the FQDN of the AS to the AS since the AS may be known with different FQDNs towards the UE 11 and the AP 15. The UE may use the FQDN to identify the correct Ks_AS. Therefore it needs to be ensured that the same FQDN is sent from the AP to the AS and from the AS to the UE.

At step 8, the AS 16a stores the information and acknowledges the HTTP request with a SIP 200 OK message to the AP 15. At step 9, the AP sends a SIP 200 OK message to the UE 11. The 200 OK message includes the nonce and the identity of the BM-SC. These two may be the same value if the FQDN is used as the nonce. At step 9b, the UE derives the AS-specific key Ks_AS from the Ks_NAF and the nonce using a key derivation function such as Ks_AS=KDF (Ks_NAF, nonce). The UE then stores the key Ks_AS with the AS identity. Finally at step 10, the AS 16a sends a message protected with Ks_AS to the UE. The UE 11 is then able to decrypt and verify the message using Ks_AS. The UE uses the AS identity to identify the correct Ks_AS.

Figure 9:
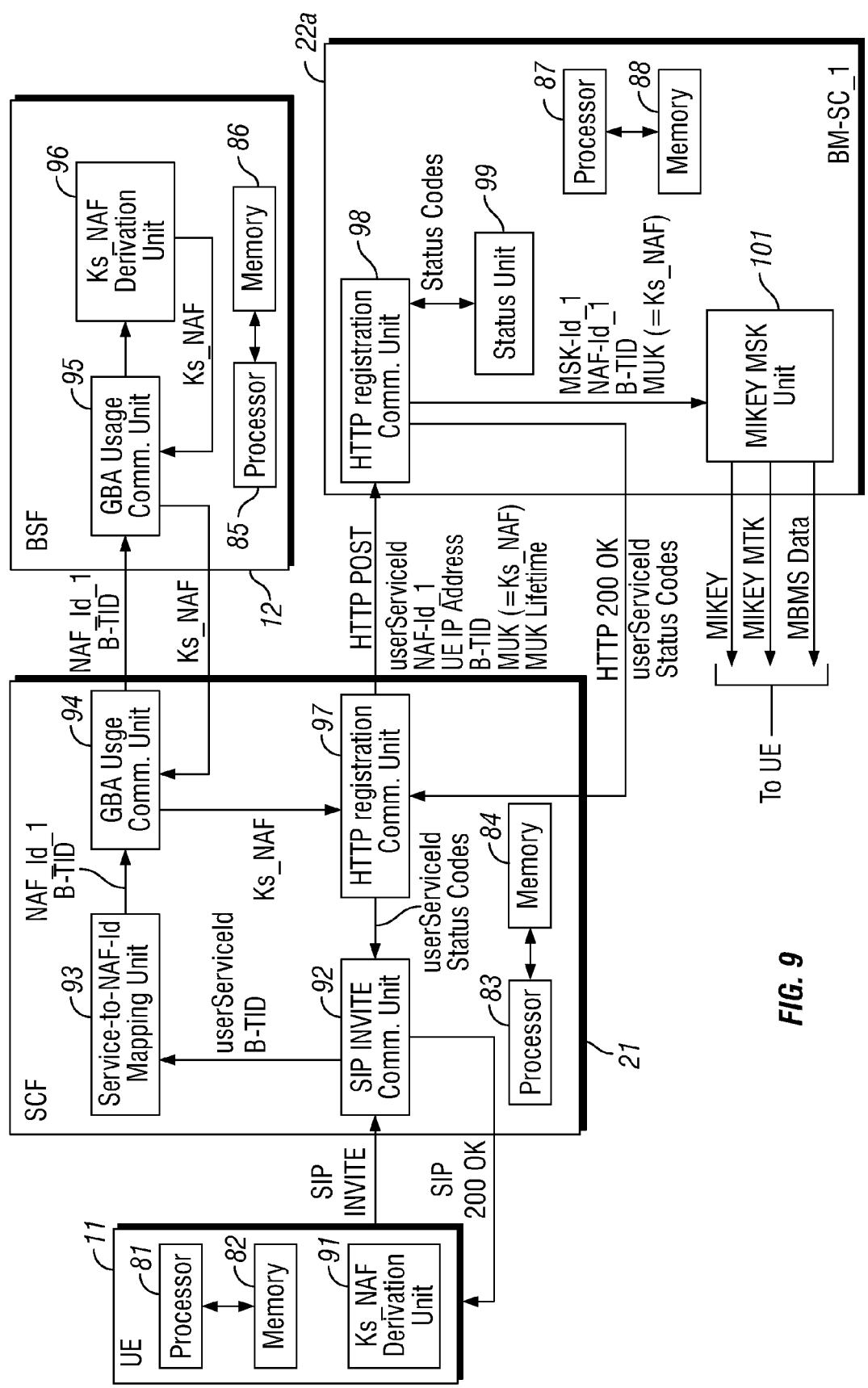
FIG. 9 is a simplified block diagram of an exemplary embodiment of the system of the present invention.

FIG. 9 is a simplified block diagram of an exemplary embodiment of the system of the present invention. The system includes the UE 11, the SCF 21, the BSF 12, and the BM-SC_1 22a. The operation of each of these units may be controlled, for example, by a processor running computer program instructions stored on a memory. In the exemplary embodiment illustrated in FIG. 9, the UE includes processor 81 and memory 82; the SCF includes processor 83 and memory 84; the BSF includes processor 85 and memory 86; and the BM-SC_1 includes processor 87 and memory 88.

The UE 11 is also shown to include a Ks_NAF Derivation Unit 91. In the embodiment illustrated in FIG. 6, the UE receives the NAF-Id (SCF allocated FQDN) in the service description from the SSF 41, and derives the Ks_NAF before beginning the SIP INVITE procedure 46. In the embodiment illustrated in FIG. 7, the UE receives the NAF-Id in the SIP 200 OK message 72 and then derives the Ks_NAF.

The UE 11 sends a SIP INVITE message via the IM CN 32 to the SCF 21. The message is received in a SIP INVITE Communication Unit 92. The SIP INVITE Communication Unit forwards the userServiceId and B-TID from the INVITE message to a Service-to-NAF-Id Mapping Unit 93, which maps the userServiceId to a NAF-Id_1. The NAF-Id_1 and the B-TID are forwarded to a GBA Usage Communication Unit 94, which forwards these parameters to the BSF 12. A GBA Usage Communication Unit 95 in the BSF receives the parameters and forwards them to a Ks_NAF Derivation Unit 96, which derives Ks_NAF. The Ks_NAF is then returned to the SCF where it is forwarded to an HTTP Registration Communication Unit 97.

The HTTP Registration Communication Unit 97 sends an HTTP POST message to the BM-SC_1 22a where it is received in an HTTP Registration Communication Unit 98. The HTTP POST message includes the userServiceId, NAF-Id_1, UE IP Address, B-TID, MUK (=Ks_NAF), and MUK Lifetime. The BM-SC_1 obtains the status of each MBMS User Service from a Service Status Unit 99, and sends a list including one status code for each MBMS User Service codes to the SCF 21 in an HTTP 200 OK message together with the userServiceId. The SCF forwards this information to the UE 11. The HTTP Registration Communication Unit 98 also sends information to a MIKEY MSK Unit 101. The information includes an MSK-Id_1, NAF-Id_1, B-TID, and MUK (=Ks_NAF).

Using this information, the MIKEY MSK Unit 101 is enabled to send MIKEY MSK messages (protected with MUK), MTK messages (protected with MSK), and MBMS Data (protected with MTK) to the UE 11, the UE having derived the MUK (=Ks_NAF) with the Ks_NAF Derivation Unit 91.

Thus, the present invention solves the problem of providing BM-SC-specific NAF keys when more than one BM-SC 22 is connected to the SCF 21. In addition, the invention solves the problem that there is not enough information in the MIKEY message to indicate to the UE which MUK (i.e. NAF key) was used to protect the MIKEY MSK message. The SCF 21 sends the B-TID and chosen NAF-Id to the BM-SC 22 which further uses them inside the MIKEY message to indicate to the UE, which NAF key was used.

In the embodiments illustrated in FIGS. 6 and 7, the present invention has the additional advantage that it does not require further derivation of NAF keys. Further derivation of NAF keys would require changes to the Universal Integrated Circuit Card (UICC) smart card used in mobile terminals in GSM and UMTS networks. If UICC based key management is in use, the NAF keys are handled within the UICC. This could be problematic in some cases as, in general, UICC impacts are not desirable in standardization. These embodiments of the present invention avoid this potential problem.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method for managing security keys in a communication network, wherein the security keys are shared between a communication device, an authentication node, and a plurality of service nodes that provide services to the communication device, the method comprising the steps of:
    the authentication node allocating to each service node a fully qualified domain name (FQDN), wherein each allocated FQDN is different from one another and different from any other FQDNs the service node already has;
    the authentication node locally associating the service provided by each of the plurality of service nodes with the FQDN allocated to each service node, wherein, for a service desired by the communication device, the FQDN allocated to the service node that provides said desired service is included in a service description that is sent to the communication device, enabling the communication device to derive a security key based on known information;
    the authentication node receiving from the communication device, a service identifier in a request for the desired service;
    the authentication node associating the service identifier for the desired service with the service node that provides the desired service and with the FQDN allocated to the service node that provides the desired service;
    the authentication node using the FQDN allocated to the service node that provides the desired service to derive the security key derived by the communication device, or to obtain the security key from a bootstrapping server in communication with the communication device; and
    the authentication node sending the security key to the associated service node, which utilizes the security key to protect communications with the communicating device;
    wherein when the communication device requests other services from different service nodes, a different security key is derived for use between the communication device and each different service node.

2. The method as recited in claim 1:
wherein the security key is used to protect a key management message sent from the service node that provides the desired service to the communication device, wherein the key management message is protected with the security key; and
wherein the security key is used by the communication device for decrypting and verifying the message.

3. The method as recited in claim 1, wherein the communication device is a mobile User Equipment, (UE).

4. An authentication node in a communication network for managing security keys shared between a communication device and a service node that provides services to the communication device, the authentication node comprising:
a processor running computer program instructions stored in a memory, the processor configured for:
allocating to each service node a fully qualified domain name (FQDN), wherein each allocated FQDN is different from one another and different from any other FQDNs the service node already has;
locally associating the service provided by each of the plurality of service nodes with the FQDN allocated to each service node, wherein, for a service desired by the communication device, the FQDN allocated to the service node that provides said desired service is included in a service description that is sent to the communication device, enabling the communication device to derive a security key based on known information;
receiving from the communication device, a service identifier in a request for the desired service;
associating the service identifier for the desired service with the service node that provides the desired service and with the FQDN allocated to the service node that provides the desired service;
using the FQDN allocated to the service node that provides the desired service to derive the security key derived by the communication device, or to obtain the security key from a bootstrapping server in communication with the communication device; and
sending the security key to the associated service node which utilizes the security key to protect communications with the communicating device;
wherein when the communication device requests other services from different service nodes, the authentication node provides to the communication device, different FQDNs allocated to different service nodes;
wherein a different security key is derived for use between the communication device and each different service node.

5. The authentication node as recited in claim 4, wherein:
the communication network is an Internet Protocol Multimedia Subsystem, (IMS), based network;
the communication device is a User Equipment, (UE);
the authentication node is a Network Application Function, (NAF), having an Authentication Proxy, (AP);
the service node is an Application Server, (AS); and
the requested service is a Multimedia Broadcast/Multicast Service, (MBMS), user service.

6. The authentication node as recited in claim 4, wherein:
the communication network is an Internet Protocol Multimedia Subsystem, (IMS), based network;
the communication device is a User Equipment, (UE);
the authentication node is a Service Control Function, (SCF);
the service node is a Broadcast/Multicast Service Center, (BM-SC); and
the requested service is a Multimedia Broadcast/Multicast Service, (MBMS), user service.

7. The authentication node as recited in claim 4, wherein the processor is further configured for:
sending the allocated authentication node identifier to the mobile communication device in a Session Initial Protocol (SIP) 200 OK message; and
sending a second security key and a transaction identifier from the authentication node to the service node in Hypertext Transfer Protocol (HTTP) POST message.

8. A system for managing security keys in a communication network, the system comprising:
a communication device,
an authentication node in communication with the communication device, and
a plurality of service nodes in communication with the authentication node and the communication device,
wherein the authentication node is configured for:
associating a plurality of fully qualified domain names (FQDNs) with a plurality of services provided by different service nodes, wherein the plurality of FQDNs identify the authentication node, and wherein each of the plurality of FQDNs is different from one another and different from any other FQDNs the service nodes already have;
allocating a selected one of the plurality of FQDNs to a service node providing a service desired by the communication device;
responsive to receiving a request for the desired service from the communication device, utilizing the allocated FQDN associated with the desired service to obtain or derive a security key for the service node providing the desired service; and
sending to the service node, the FQDN, an IP address of the communication device, and a shared security key unique to the FQDN;
wherein the service node is configured for:
sending to the communication device a key management message protected with the shared security key, the key management message including the FQDN and the transaction identifier;
wherein the mobile communication device is configured for:
receiving the FQDN either from the authentication node or in a service description obtained from the network;
utilizing the FQDN to derive the shared security key based on known information; and
decrypting and verifying the key management message using the shared security key;
wherein when the communication device requests other services from different service nodes, the authentication node provides to the communication device, different FQDNs allocated to different service nodes;
wherein a different security key is derived for use between the communication device and each different service node.

9. The system as recited in claim 8, wherein:
the communication network is an Internet Protocol Multimedia Subsystem, (IMS), based network;
the mobile communication device is a User Equipment, (UE);
the authentication node is a Network Application Function, (NAF), having an Authentication Proxy, (AP);
the service node is an Application Server, (AS); and
the requested service is a Multimedia Broadcast/Multicast Service, (MBMS), user service.

10. The system as recited in claim 8, wherein:
  the communication network is an Internet Protocol Multimedia Subsystem, (IMS), based network;
  the mobile communication device is a User Equipment, (UE);
  the authentication node is a Service Control Function, (SCF);
  the service node is a Broadcast/Multicast Service Center, (BM-SC); and
the requested service is a Multimedia Broadcast/Multicast Service, (MBMS), user service.

* * * * *